United States Patent [19]

Takayanagi et al.

[11] Patent Number: 5,626,994
[45] Date of Patent: May 6, 1997

[54] PROCESS FOR FORMING A BLACK MATRIX OF A COLOR FILTER

[75] Inventors: Takashi Takayanagi; Fumiaki Shinozaki, both of Shizuoka, Japan

[73] Assignee: Fuji Photo Film Co., Ltd., Kanagawa, Japan

[21] Appl. No.: 572,168

[22] Filed: Dec. 13, 1995

[30] Foreign Application Priority Data

Dec. 15, 1994 [JP] Japan .................................. 6-311706
Dec. 15, 1994 [JP] Japan .................................. 6-311707
Jan. 26, 1995 [JP] Japan .................................. 7-10755

[51] Int. Cl.⁶ .................................. G02B 5/20
[52] U.S. Cl. .................................. 430/7; 430/6; 430/25; 430/321; 430/413
[58] Field of Search .................................. 430/7, 321, 413, 430/6, 25, 23

[56] References Cited

U.S. PATENT DOCUMENTS 4,387,146  6/1983  Whitemore .................................. 430/7

FOREIGN PATENT DOCUMENTS 4-32802  2/1992  Japan .
6-75110  3/1994  Japan .

OTHER PUBLICATIONS

Abstract of JP 4–032802, Mochizuki et al., "Production of Color Filter" (Feb. 1992).

*Primary Examiner*—John A. McPherson
*Attorney, Agent, or Firm*—Sughrue, Mion, Zinn, Macpeak & Seas

[57] ABSTRACT

A safe and low cost process for forming a black matrix for a color filter, which process provides high light screening properties and is suitable for panel processing. The process comprises the steps of providing a transparent substrate having provided thereon an aqueous resin layer containing physical development nuclei; supplying a developer for physical development on the aqueous resin layer; superposing a donor sheet containing a metallic compound comprising metal ions on the aqueous resin layer via the developer for physical development; and precipitating a metal of the metallic compound in the aqueous resin layer by physical development. Furthermore, the aqueous resin layer may or may not be patterned.

21 Claims, 3 Drawing Sheets

5,626,994

PROCESS FOR FORMING A BLACK MATRIX OF A COLOR FILTER

FIELD OF THE INVENTION

This invention relates to a process for forming a black matrix of a color filter for use in color displays such as liquid crystal displays.

BACKGROUND OF THE INVENTION

For making a high quality and high contrast liquid crystal color display, a black matrix having excellent light screening properties must be formed between the pixels having three colors of a color filter. In particular, the black matrix of a liquid crystal color display of active matrix drive system must also have high light screening properties. This prevents image quality deterioration which accompanies a current leak due to the light of a thin film transistor (TFT). Widely used black matrices are generally obtained by the photolithographic patterning of chromium that has been deposited, for example, by sputtering. Because of the use of a thin film of chromium, this method provides black matrices having high light-screening properties and good pattern accuracy. However, this method is costly because it requires a vacuum thin film deposition step such as sputtering, or the etching waste from the etching system gives rise to a safety problem.

Methods for producing black matrices without using chromium include a method comprising patterning a resist film having dispersed therein a black pigment (e.g., carbon black) or a black dye by photolithography. This method is less costly and safer than the method using chromium. However, the resist containing a black dye or pigment does not provide sufficient resolving power. Also, sufficient light screening properties are hard to obtain.

JP-A-6-75110 (the term "JP-A" as used herein means an "unexamined published Japanese patent application") discloses a method utilizing electroless plating. The method provides a black matrix having high light screening properties that is provide by a precipitated metal. A problem associated with this method resides in the co-existence of a metallic compound of the metal to be precipitated and a reducing agent in the electroless plating bath. This makes the bath unstable and therefore leads to increased maintenance cost.

JP-A-4-32802 discloses a method which includes the reduction of a silver salt. The method comprises coating a substrate with a silver halide emulsion, exposing the emulsion layer through a mask, and developing and fixing the exposed area corresponding to a black matrix pattern to reduce and precipitate silver. The incurred cost is relatively low, but the method cannot escape the problems arising from the emulsion layer which remains in the unexposed areas. That is, the emulsion layer tends to become colored in the heat treatment for paneling, or suffers from the generation of wrinkles or cracks when transparent electrodes are formed.

SUMMARY OF THE INVENTION

An object of the present invention is to provide a safe and low cost process for forming a black matrix for a color filter, which process provides high light screening properties and is suitable for panel processing.

The above object of the present invention is accomplished by a process for forming a black matrix comprising the steps of:

providing a transparent substrate having provided thereon an aqueous resin layer containing physical development nuclei;

supplying a developer for physical development on the aqueous resin layer;

superposing a donor sheet containing metal ions on the aqueous resin layer via the developer for physical development; and precipitating a metal of said metallic compound in the aqueous resin layer by physical development. Furthermore, the aqueous resin layer may or may not be patterned.

BRIEF DESCRIPTION OF THE DRAWINGS

FIGS. 2-1 through 2-5 schematically illustrate the steps for forming a black matrix according to the process of the present invention, in which:

FIG. 2-1 is a transparent substrate having formed thereon a photoresist layer;

FIG. 2-2 is a transparent substrate where the photoresist layer has been patterned by imagewise exposure and development (the areas where photoresist has been removed by development correspond to the subsequently formed black matrix pattern);

FIG. 2-3 is a transparent substrate where the patterned photoresist coated with an aqueous resin layer;

FIG. 2-4 is a transparent substrate having thereon a patterned aqueous resin layer 9 corresponding to the subsequently formed black matrix pattern; and FIG. 2-5 is a transparent substrate having formed thereon a black matrix layer.

FIGS. 3-1 through 3-5 schematically illustrate the steps for forming a black matrix according to the process of the present invention, in which:

FIG. 3-1 is a transparent substrate having formed thereon a photoresist layer;

FIG. 3-2 is a transparent substrate where the photoresist layer has been patterned by imagewise exposure and development (the areas where photoresist has been removed by development correspond to the subsequently formed black matrix pattern);

FIG. 3-3 is a transparent substrate where the patterned photoresist is coated with an aqueous resin layer;

FIG. 3-4 is a transparent substrate in which a metal is precipitated in the aqueous resin layer; and FIG. 3-5 is a transparent substrate having formed thereon a patterned black matrix layer.

FIGS. 4-1 to 4-3 schematically illustrate the steps for forming a black matrix according to the process of the present invention, in which:

FIG. 4-1 is a transparent substrate having formed thereon a photosensitive aqueous resin layer containing physical development nuclei;

FIG. 4-2 is a transparent substrate where the aqueous resin layer has a pattern corresponding to a black matrix pattern; and FIG. 4-3 is a transparent substrate having formed thereon a black matrix layer.

DETAILED DESCRIPTION OF THE INVENTION

Figure 1:
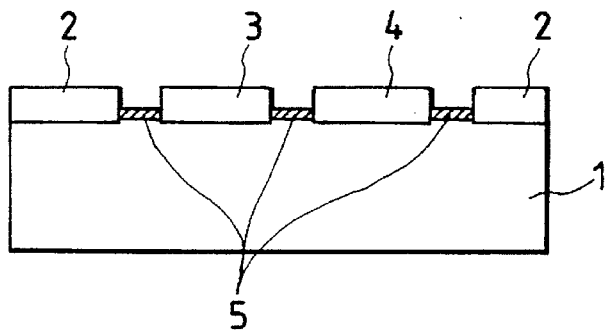
FIG. 1 is a schematic cross sectional view of a color filter substrate having a black matrix formed by the process of the present invention.

A black matrix according to the present invention is formed on a color filter substrate for displaying color on a liquid crystal display. Specifically, as shown in FIG. 1, black matrix 5 is formed in the interstices between red pixel 2, green pixel 3, and blue pixel 4 provided on transparent substrate 1. The black matrix prevents light from leaking between the color pixels to thereby achieve high contrast display characteristics.

A patterned aqueous resin layer having physical development nuclei which corresponds to a subsequently formed black matrix pattern can be formed on a substrate according to first to fourth methods described below.

Figures 1, 2:
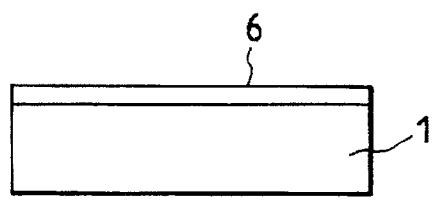
Figure 2:
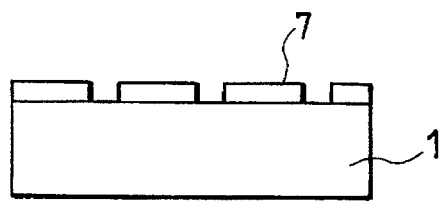

A first method comprises applying an aqueous resin solution containing physical development nuclei to a photoresist pattern formed on a transparent substrate, and removing the photoresist layer in those areas corresponding to the pixel area (areas other than those of a black matrix pattern) together with the aqueous resin layer containing physical development nuclei by a lift-off process. Referring to the drawings, photoresist layer 6 is provided on transparent substrate 1 by coating (FIG. 2-1), and photoresist layer 6 is imagewise exposed to light and developed to remove areas corresponding to a black matrix pattern and to leave photoresist pattern 7 (FIG. 2-2).

The transparent substrate for use in this invention includes glass, such as soda-lime glass and borosilicate glass, and plastics. The thickness of the transparent substrate is generally from 0.5 to 1.1 mm.

Commercially available positive or negative photoresists can be used in the present invention. When a particularly high resolving power is needed, a positive photoresist is preferred. The photoresist layer preferably has a thickness of 0.1 to 3 μm. A photoresist layer thinner than 0.1 μm is not sharply stripped off (lack of good definition) when removed together with the aqueous resin layer formed thereon by lift-off. This results in edge roughness. If the photoresist layer is thicker than 3 μm, the thickness of the aqueous resin layer applied thereon tends to be non-uniform, which ultimately leads to density unevenness of the resulting black matrix.

Suitable positive photoresists include a mixture of a novolak resin and a naphthoquinonediazide compound, in which the naphthoquinonediazide compound controls the alkali solubility of the novolak resin. Upon exposure to light, the naphthoquinonediazide compound becomes an indenecarboxylic acid and loses its control on alkali solubility. As a result, the resist in the exposed areas is rendered soluble in a developer such as an aqueous alkali solution. A number of commercially available positive photoresists of this type are known. For example, "OFPR-2" produced by Tokyo Ohka Kogyo Co., Ltd. and "FH 2130" produced by Fuji Hunt Electronics Technology Co., Ltd. can be used in the present invention.

Negative photoresists include photopolymerization type and photocrosslinking type photoresists. The latter type is usually preferred. Photocrosslinking type photoresist undergo a crosslinking reaction on exposure to become insoluble in organic solvents or aqueous alkali solutions. Examples of negative photoresists of this type include a cyclized rubber/bisazide system containing cyclized rubber as a high-molecular component and a small amount of an aromatic bisazide compound as a photocrosslinking agent; and a phenolic resin/azide system containing an alkali-soluble phenolic resin and an aromatic azide compound. A number of such commercially available negative photoresists are known. For example, "OMR-83" and "OMR-85", produced by Tokyo Ohka Kogyo Co., Ltd., can be used in the present invention. Both of these negative photoresists comprise a cyclized rubber/bisazide system.

Figures 2, 3:
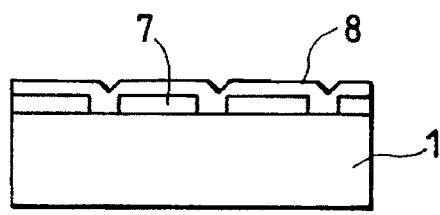

An aqueous resin layer 8 containing physical development nuclei is formed on the photoresist pattern by coating as shown in FIG. 2-3. An aqueous resin solution containing, for example, palladium as physical development nuclei is prepared by reducing a palladium compound (e.g., palladium chloride) that is dissolved in water with a reducing agent (e.g., sodium borohydride) in the presence of a protective colloid, such as polyvinyl pyrrolidone, and adding thereto an aqueous resin (e.g., polyvinyl alcohol). In general, the concentration of the metallic compound which provides physical development nuclei upon reduction in the aqueous resin solution preferably ranges from 0.01 to 0.4% by weight. At concentrations lower than 0.01% by weight, physical development tends to be insufficient for obtaining the desired optical density for a black matrix. An aqueous resin solution having a metallic compound concentration that is higher than 0.4% by weight is unstable due to the tendency of the nuclei to agglomerate at the time of nucleation and is practically unsuitable for preparation. Useful physical development nuclei include metals such as gold, platinum, etc. as well as palladium, and active metallic compounds such as nickel sulfide.

In an super twisted nematic (STN) system for use in passive liquid crystal displays, a black matrix having an optical density of about 2 will provide sufficient light screening properties for obtaining a satisfactory display. In a TFT system used in active liquid crystal displays, a higher image contrast is required such that an optical density of 3 or higher is desired. In particular, in a high definition AV system, a black matrix having an optical density exceeding 3 is required. In the present invention, the concentration of palladium chloride in the aqueous resin layer that is required for obtaining an optical density exceeding 2 is 0.01% by weight or higher.

The protective colloid for use in the present invention includes polyvinyl pyrrolidone, gelatin, polyvinyl alcohol and surface active agents. The protective colloid is preferably used in a weight ratio of 0.1 to 200 to the metallic compound before reduction, e.g., palladium chloride. If the weight ratio is lower than 0.1, the metal produced by reduction tends to agglomerate. If it is higher than 200, the concentration of the precipitating metal in the protective colloid is too low to provide sufficient optical density for a black matrix after physical development.

The aqueous resin for use in the present invention includes polyvinyl alcohol and derivatives thereof, natural aqueous resins such as gelatin and casein, polyacrylamide, polyamide, polyethylene oxide, cellulose derivatives such as carboxymethyl cellulose, and mixtures of two or more thereof.

In order to improve adhesion of the aqueous resin layer to the transparent substrate, the aqueous resin may be hardened by crosslinking. In this case, a hardening agent may be added to the aqueous resin, e.g., 2,4-dichloro-6-hydroxy-s-triazine for gelatin, or boric acid, borax, an aldehyde, an aldehyde derivative or glyoxal for polyvinyl alcohol or a derivative thereof.

In order to uniformly apply the aqueous resin solution without repellency, the solution may contain a surface active agents or an alcohol such as methanol. The solution may further contain an inorganic pigment, such as silica sol or alumina sol, or an organic pigment, such as benzoguanamine fine particles, to adjust the viscosity. The aqueous solution for an aqueous resin layer is applied in such an amount that corresponds to a dry thickness of generally from 0.1 to 1.5 μm, preferably from 0.3 to 0.9 μm.

The aqueous resin solution containing physical development nuclei is applied to patterned photoresist 7 by spin coating or roll coating, and dried to form aqueous resin layer 8 as shown in FIG. 2-3. Thereafter, aqueous resin layer 8 is preferably subjected to heat treatment at 80° to 240° C. so as to impart resistance against water or an alkali in the subsequent physical development. If the heating temperature is lower than 80° C., sufficient resistance to water or an alkali cannot be obtained. If it is higher than 240° C., the metal precipitation tends to be insufficient. The heat treatment is usually carried out for about 5 to 30 minutes.

Figures 2, 3, 4:
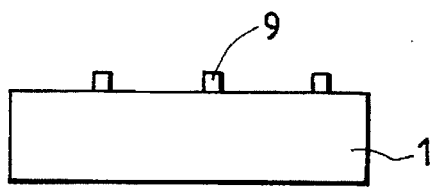

The unnecessary photoresist layer (namely, the pixel areas provided between the patterned black matrix) and the aqueous resin layer directly on top of the photoresist layer are removed (in a lift-off process) by treating with a resist stripper capable of dissolving the photoresist or releasing the photoresist from the substrate. However, the resist stripper is substantially incapable of dissolving (or releasing) the aqueous resin layer. The lift off process therefore imagewise leaves a patterned aqueous resin layer 9 on the substrate 1 which corresponds to the subsequently formed black matrix (FIG. 2-4).

Resist strippers which can be used to remove a positive photoresist include an aqueous alkali solution containing a water-soluble solvent, such as N-methyl-2-pyrrolidinone, or an aqueous solution of an alkali, such as potassium hydroxide or sodium hydroxide. The former aqueous alkali solution containing a water-soluble solvent includes a positive resist stripper FH 2103 produced by Fuji Hunt Electronics Technology Co., Ltd. In using the latter aqueous alkali solution, the development time may be shortened by exposing the entire surface of the aqueous resin layer to an exposure energy of about 100 mJ prior to development. The positive photoresist layer can also be removed with an organic solvent, such as acetone or methyl ethyl ketone.

In the case of negative photoresists, the unnecessary photoresist layer that has been photocrosslinked or photopolymerized can be removed from the transparent substrate by treating with an organic solvent, such as acetone or methyl ethyl ketone.

The aqueous resin layer may also be formed by transfer coating. Therein, the aqueous resin solution containing physical development nuclei is applied to a plastic film, such as a polyethylene terephthalate film, dried, and transferred to the patterned photoresist layer formed on a transparent substrate.

A developer for physical development is supplied onto the patterned aqueous resin layer, and a donor sheet containing a metallic compound, such as a metal salt, is superposed thereon. As a result, the metal in the donor sheet precipitates in the patterned aqueous resin layer to provide a metal-containing aqueous resin layer 10 (FIG. 2-5). The substrate is then washed with water and dried to provide a black matrix substrate.

The donor sheet which can be used for physical development comprises a base film, such as a polyethylene terephthalate film, coated with a compound of the metal that is to be precipitated. For silver precipitation, a base film is coated with a silver halide emulsion, such as a silver chloride, silver bromide or silver iodide emulsion. Commercially available silver donor sheets, such as "QNF-100" made by the Fuji Photo Film Co., Ltd. (negative film for photographing that is part of the FUJI Q-ART system) can be used. For copper or nickel precipitation, a base sheet is coated with a mixture of an aqueous resin, e.g., gelatin, and a copper salt, e.g., copper sulfate, or a nickel salt, e.g., nickel chloride or nickel sulfate, respectively. The amount of the metallic compound contained in the donor sheet is generally from 0.5 to 10 g/m$^2$.

The developer for physical development is a solution containing a reducing agent capable of reducing the metallic compound of the donor sheet. Such reducing agents include formalin, sodium hypophosphite, hypophosphorous acid, N-dimethylamineborane, hydrazine and sodium borohydride. If desired, the developer may contain a pH adjusting agent, a pH buffer, a stabilizer, a complexing agent for metallic ion stabilization, and the like. The developer for physical development is supplied between the donor sheet and the aqueous resin layer by coating with a spongy roller impregnate with the developer or by dropping the developer onto the aqueous resin layer formed on the transparent substrate followed by spreading it using, for example, a roller.

After the metal-containing aqueous resin layer is washed and dried, the resin layer is preferably subjected to heat treatment at 120° to 260° C. to improve adhesion to the substrate. At heating temperatures lower than 120° C., the improvement tends to be inadequate. At temperatures higher than 260° C., the film strength is lowered to reduce the adhesion. The heat treatment is usually carried out for about 10 to 140 minutes.

A second method for forming a patterned aqueous resin layer having physical development nuclei on a transparent substrate, which corresponds to a black matrix pattern, comprises applying a solution of an aqueous resin to a photoresist pattern formed on a transparent substrate to form an aqueous resin layer; contacting the aqueous resin layer with an aqueous solution containing physical development nuclei to allow the aqueous resin layer to adsorb the physical development nuclei; and removing the photoresist layer corresponding to the pixel areas (i.e., areas other than those areas where a black matrix pattern is subsequently formed) together with the upper aqueous resin layer containing the physical development nuclei by a lift-off method.

The difference between the first and second methods resides in that physical development nuclei are introduced into the aqueous resin layer by adsorption as explained below. With respect to the photoresist, patterning of the photoresist, physical development, and the like, the details described for the first method also apply to the second method.

The aqueous solution of the aqueous resin is applied to a transparent substrate by spin coating, roller coating or the like coating technique or by transfer coating as described above. The same aqueous resin as used in the first method can be used in the second method. If desired, a hardening agent and other additives may be added to the resin solution.

An aqueous solution containing physical development nuclei is then brought into contact with the aqueous resin layer by dip coating, spin coating, spray coating, etc. such that the physical development nuclei are adsorbed by the aqueous resin layer. Useful physical development nuclei include metals, such as palladium, platinum and gold, or metallic compounds, such as palladium chloride and nickel sulfide. The term "aqueous solution containing physical development nuclei" as used herein includes a colloidal aqueous solution or an aqueous solution containing the above-described metal or metallic compound. For example, palladium colloidal aqueous solutions containing tin ions as a protective colloid are commercially sold mainly as a catalyst for electroless plating of copper, etc. These commercial products may be used as such, or diluted with pure water.

The aqueous resin layer having adsorbed physical development nuclei is preferably subjected to heat treatment at 80° to 240° C. for about 5 to 30 minutes so as to impart resistance against water or an alkali used in the subsequent physical development. If the heating temperature is lower than 80° C., sufficient resistance to water or an alkali is not obtained. If it is higher than 240° C., precipitation of the metal by physical development tends to be insufficient. Thereafter, in the same manner as in the first method, the unnecessary photoresist layer is removed together with the upper aqueous resin layer by a lift-off method to give a patterned aqueous resin layer, and metal is precipitated in the patterned aqueous resin layer by physical development, preferably followed by the heat treatment to improve adhesion to the substrate, to obtain a black matrix.

While the first and second methods have been described with respect to the embodiment in which patterning of the aqueous resin layer by lift-off is followed by physical development using a donor sheet and a developer for physical development, the physical development for metal precipitation may precede the patterning step.

Figures 2, 3, 4, 5:
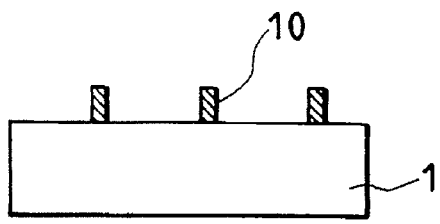
Figures 1, 3:
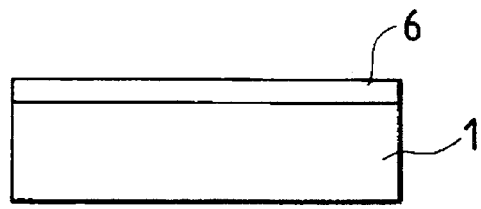
Figures 2, 3:
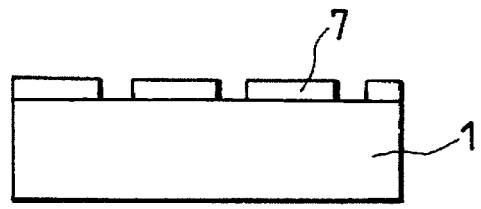
Figure 3:
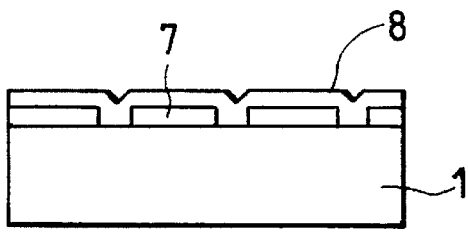
Figures 3, 4:
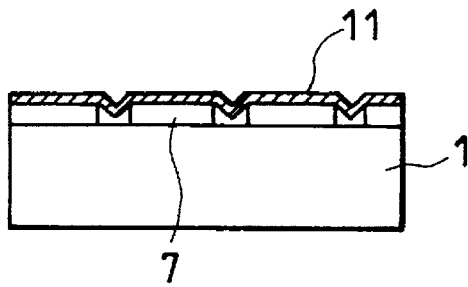
Figures 3, 4, 5:
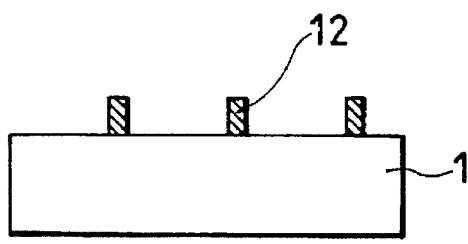
Figures 1, 4:
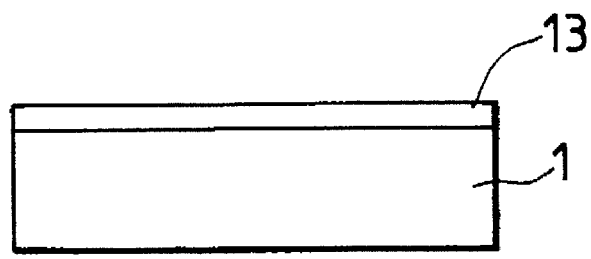
Figures 2, 4:
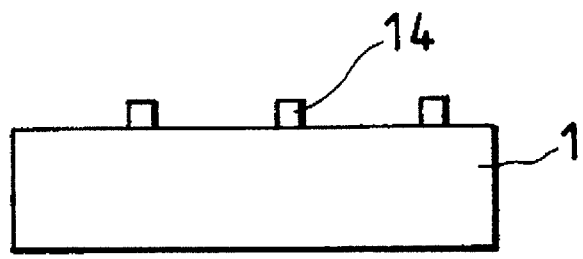
Figures 3, 4:
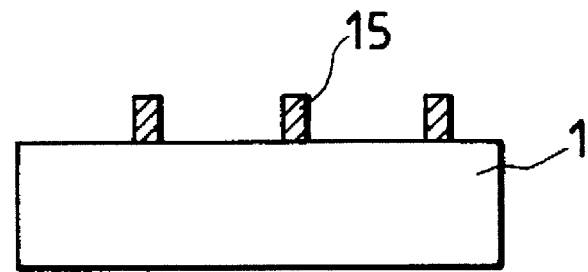

In this case, the first method is carried out as follows. Aqueous resin layer 8 containing physical development nuclei is formed on transparent substrate 1 having photoresist pattern 7 (FIG. 3-3) and is preferably subjected to heat treatment for imparting resistance to water or an alkali. Then, a donor sheet containing a metallic compound is superposed on the aqueous resin layer (usually over the entire area of the resin layer) via a developer for physical development to cause the metal to precipitate in the aqueous resin layer through physical development (FIG. 3-4). The unnecessary photoresist layer is then removed together with the upper metal-containing aqueous resin layer by a lift-off process to leave patterned metal-containing aqueous resin layer 12 on substrate 1 (FIG. 3-5).

After washing and drying, the metal-containing aqueous resin layer is preferably subjected to heat treatment at 120° to 260° C. in order to improve adhesion to the substrate. At heating temperatures lower than 120° C., the improvement tends to be inadequate. At temperatures higher than 260° C., the film strength is lowered to reduce the adhesion. The heat treatment is usually carried out for about 10 to 140 minutes.

In the case of the second method, after the aqueous resin layer adsorbs physical development nuclei and is preferably subjected to heat treatment for imparting resistance to water or an alkali, a donor sheet containing a metallic compound is superposed thereon via a developer for physical development to cause the metal to precipitate in the aqueous resin layer through physical development. The unnecessary photoresist layer is then removed together with the upper metal-containing aqueous resin layer. The residual metal-containing aqueous resin layer is preferably subjected to heat treatment to improve adhesion to the substrate and to obtain the desired black matrix pattern.

A third method for forming a patterned aqueous resin layer having physical development nuclei on a transparent substrate, which corresponds to a black matrix pattern, comprises forming a photosensitive aqueous resin layer containing physical development nuclei on a transparent substrate, for example, by coating, imagewise exposing the photosensitive aqueous resin layer, and developing the exposed aqueous resin layer to form a patterned aqueous resin layer.

The coating composition which can be used for forming the photosensitive aqueous resin layer is a mixture of an aqueous solution containing physical development nuclei and a solution of a photosensitive aqueous resin. The aqueous solution containing physical development nuclei can be prepared in the same manner as in the first method.

The photosensitive aqueous resins which can be used in the third method are negatively working aqueous resins. Negative photosensitivity can be imparted to an aqueous resin by mixing the aqueous resin with a compound having an unsaturated group, such as an acrylic group or a methacrylic group, and a photopolymerization initiator. Because the negative photosensitive aqueous resin cures on exposure, the exposed areas remain after development to provide a patterned resin layer on a transparent substrate.

Examples of suitable compounds having an unsaturated group include monofunctional monomers, such as methoxydiethylene glycol methacrylate, methoxypolyethylene glycol #230 methacrylate, methoxypolyethylene glycol #400 acrylate, 2-hydroxyethyl acrylate, 2-hydroxypropyl acrylate, and 2-hydroxyethyl methacrylate; difunctional monomers, such as triethylene glycol diacrylate, polyethylene glycol #200 diacrylate, and polyethylene glycol #400 diacrylate; trifunctional monomers, such as trimethylolpropane triacrylate; tetrafunctional monomers, such as pentaerythritol tetraacrylate; and hexafunctional monomers, such as dipentaerythritol hexaacrylate. These functional compounds may be used either individually or as a mixture thereof.

Useful photopolymerization initiators include those generally used for photopolymerization of acrylate or methacrylate monomers, such as benzophenone compounds, benzil compounds, benzoin compounds, benzoin ethyl ether compounds, benzoyl peroxide compounds, and azobisisobutyronitrile compounds.

Photosensitivity can also be imparted to an aqueous resin by mixing the aqueous resin with a diazo compound or an azide compound in place of the above-described combination of an unsaturated compound and a photopolymerization initiator.

Still another method for imparting photosensitivity to an aqueous resin comprises directly bonding a photosensitive group to the aqueous resin. Examples of photosensitive aqueous resins of this type are stilbazole-modified polyvinyl alcohol and cinnamic acid-modified polyvinyl alcohol which is prepared by condensation of cinnamic acid.

The photosensitive aqueous resin solution containing physical development nuclei is applied to a transparent substrate by spin coating, roll coating, etc. and dried to form photosensitive aqueous resin layer 13 (FIG. 4-1). Alternatively, resin layer 13 may be provided on the substrate by transfer coating. The resin layer is imagewise exposed by means of a pattern exposure system using, e.g., a mercury lamp, followed by development to leave patterned aqueous resin layer 14 containing physical development nuclei which corresponds to the subsequently formed black matrix pattern (FIG. 4-2). Water can be used as a developer. To improve developing properties, a solvent, such as benzyl alcohol, may be added to water, or the pH of the water may be adjusted appropriately. The developing temperature preferably ranges from 20° to 50° C. If the developing temperature is too low, undeveloped areas tends to remain and a clear pattern is not formed. If the developing temperature is too high, side etching tends to occur such that a clear pattern also is not formed. The development step may be conducted by brush development, spray development or paddle development.

Patterned aqueous resin layer 14 (FIG. 4-2) having physical development nuclei is preferably subjected to heat treatment at 80° to 240° C. for about 5 to 30 minutes so as to impart resistance against water or an alkali in the subsequent physical development. If the heating temperature is lower than 80° C., sufficient resistance to water or an alkali cannot be obtained. If it is higher than 240° C., precipitation of the metal by physical development tends to be insufficient.

Thereafter, the aqueous resin layer is subjected to physical development to precipitate metal in the aqueous resin layer (15 in FIG. 4-3). The metal-containing aqueous resin layer is preferably subjected to heat treatment in the same manner as in the first method to provide a black matrix.

A fourth method for forming a patterned aqueous resin layer having physical development nuclei on a transparent substrate, which corresponds to a black matrix pattern, comprises forming a photosensitive aqueous resin layer containing physical development nuclei on a transparent substrate, for example, by coating; contacting the photosensitive aqueous resin layer with an aqueous solution containing physical development nuclei to allow the aqueous resin layer to adsorb the physical development nuclei; imagewise exposing the photosensitive aqueous resin layer containing the adsorbed physical development nuclei; and developing the exposed aqueous resin layer to form a patterned aqueous resin layer containing physical development nuclei.

The same photosensitive aqueous resin as described for the third method can be used in the fourth method.

The photosensitive aqueous resin layer is contacted with an aqueous solution of physical development nuclei, for example, by spin coating, dip coating, spray coating, etc. to introduce the physical development nuclei into the resin layer by adsorption. The photosensitive aqueous resin layer containing the adsorbed physical development nuclei is exposed to light and developed to form a patterned aqueous resin layer containing physical development nuclei. Thereafter, a metal is precipitated in the resin layer by physical development, and the metal-containing resin layer is preferably subjected to heat treatment to obtain a black matrix in the same manner as in the first method.

While the third and fourth methods have been described with respect to the embodiment in which development of the exposed aqueous resin layer (patterning) is followed by physical development using a donor sheet and a developer for physical development, the physical development for metal precipitation may precede the patterning.

In this case, the third or fourth method is carried out by imagewise exposing a photosensitive aqueous resin layer having physical development nuclei to form a latent image, superposing a donor sheet containing a metallic compound, such as a metal salt, on the aqueous resin layer containing physical development nuclei and having a latent image (usually over the entire area of the aqueous resin layer) via a developer for physical development to cause the metal to precipitate in the aqueous resin layer, and developing the metal-containing resin layer having a latent image to form a black matrix. In this case, the resin layer is also preferably subjected to heat treatment before physical development and after metal precipitation in the same manner as in the first method.

The present invention will now be illustrated in greater detail by way of the following Examples, but it should be understood that the present invention is not deemed to be limited thereto. Unless otherwise indicated, all the percents are by weight.

EXAMPLE 1

Forming a Black Matrix Substrate by Method 1:

A 100 mm square was cut from 1.1 mm thick borosilicate glass, 7059 glass produced by Corning Glass Works, and cleaned by ultrasonic cleaning using Semicoclean 23 produced by Furuuchi Kagaku K. K. to prepare a glass substrate. A positive photoresist FH 2130 produced by Fuji Hunt Electronics Technology Co., Ltd. (hereinafter FH Co.) was applied to the glass substrate by spin coating to a thickness of 1.1 μm and dried at 80° C. for 20 minutes. The photoresist was exposed by means of an aligner UV 330 manufactured by Oak, Inc. at an exposure energy of 100 mJ/cm$^2$ through a mask having a line width of 20 μm (20 μm wide light-transmitting lines corresponding to a black matrix pattern) and developed with a developer for positive resist FHD-5 produced by the FH Co. A solution of an aqueous resin containing physical development nuclei which was prepared as follows was applied to the patterned positive resist by spin coating to a thickness of about 0.24 μm and heated at 150° C. for 7 minutes.

(Preparing a Physical Development Nuclei-Containing Aqueous Resin Solution)

In 22.6 g of pure water were dissolved 0.2 g of palladium chloride (reagent produced by Wako Pure Chemical Industries, Ltd.) and 0.2 g of commercially available hydrochloric acid by stirring at about 40° C. The resulting palladium chloride aqueous solution and a reducing agent solution prepared by dissolving 0.03 g of sodium borohydride in 25 g of pure water were added dropwise to a protective colloid aqueous solution prepared by dissolving 0.05 g of polyvinylpyrrolidone K90 (produced by Tokyo Kasei Kogyo K.K.) in 26.4 g of pure water at 30° C. over 30 minutes. After stirring the mixture at room temperature for 1 hour, 22 g of a 9.01% aqueous solution of polyvinyl alcohol (GOHSEFIMER Z200, produced by The Nippon Synthetic Chemical Industry Co., Ltd.) was added thereto. Methanol (0.5 g) was further added thereto to prepare an aqueous resin solution containing physical development nuclei.

The positive resist pattern and the aqueous resin layer on the resist were removed with a positive resist stripper MS2001 produced by the FH Co. while lightly brushing at 40° C. for 90 seconds (patterning by a lift-off method). After washing with pure water, the substrate was dried at 80° C. for 20 minutes to obtain a glass substrate having formed thereon a patterned aqueous resin layer containing physical development nuclei corresponding to a black matrix pattern. The glass substrate having a patterned aqueous resin layer was uniformly wetted with a developer for physical development, Activator QA-1 for Q-ART System, a product of Fuji Photo Film Co., Ltd. A donor film, photographing negative film QNF-100 for Q-ART System produced by Fuji Photo Film Co., Ltd., was superposed thereon for 1 minute to allow silver to precipitate in the patterned aqueous resin layer containing physical development nuclei (also referred to as diffusion transfer). The donor film was removed, and the glass substrate was washed with pure water and heated in an oven at 180° C. for 30 minutes to obtain the desired black matrix. The optical density as measured with a Macbeth densitometer was 3.2, which density is sufficient for use as a black matrix.

(Preparing a Color Filter)

On the resulting glass substrate having thereon the black matrix, a color filter layer composed of three colors B, G, and R (thickness: about 1.9 μm) was formed by using pigment dispersions for a color filter (products of the FH Co.). A transparent electrode (ITO) was then formed thereon by sputtering at 200° C. The resulting color filter had no appearance defects, such as wrinkles or cracks, and did not exhibit an appreciable reduction in transmission due to coloration.

EXAMPLE 2

Forming a Black Matrix Substrate by Method 2:

A 7059 glass substrate having a patterned positive resist layer was spin coated with an aqueous solution of an aqueous resin to a coating thickness of 0.26 μm in the same manner as in Example 1, except for replacing the aqueous resin solution containing physical development nuclei as used in Example 1 with an aqueous solution of an aqueous resin prepared by mixing 22.2 g of a 9.01% aqueous solution of polyvinyl alcohol (GOHSEFIMER Z200), 1 g of methanol, and 76.8 g of pure water. The coated substrate was heated in an oven at 150° C. for 7 minutes, dipped in a predipping liquid, Emplate PC236 solution produced by Japan Meltex Inc., for 3 minutes and washed with water. The substrate was further dipped in a palladium catalyst-imparting liquid, Emplate Activator 444 solution produced by Japan Meltex Inc., for 6 minutes and washed with water. The substrate was furthermore dipped in an adhesion enhancing liquid, Emplate PA491 produced by Japan Meltex Inc., for 10 minutes, followed by washing with water. The polyvinyl alcohol layer found faintly colored brown, indicating adsorption of palladium.

The resist layer and the aqueous resin layer thereon were removed by lift-off, and the remaining patterned aqueous resin layer was subjected to physical development by diffusion transfer in the same manner as in Example 1 to obtain a black matrix substrate. The resulting black matrix had an optical density of 3.4 and a reflectance of 17% at 550 nm, and provided satisfactory results similar to those obtained in Example 1.

A color filter was prepared using the resulting black matrix substrate, and a transparent electrode layer was provided in the same manner as in Example 1. No problems of appearance or coloration were observed.

EXAMPLE 3

The same solution of an aqueous resin containing physical development nuclei as in Example 1 was applied to a patterned positive resist by spin coating to a thickness of about 0.24 μm and heated at 150° C. for 7 minutes in the same manner as in Example 1.

The glass substrate having an aqueous resin layer was uniformly wetted with a developer for physical development, Activator QA-1 for Q-ART System, a product of Fuji Photo Film Co., Ltd. A donor film, photographing negative film QNF-100 for Q-ART System produced by Fuji Photo Film Co., Ltd., was superposed thereon for 1 minute to allow silver to precipitate on the entire surface of the aqueous resin layer containing physical development nuclei (also referred to as diffusion transfer). The donor film was removed, and the glass substrate was washed with pure water and heated in an oven at 160° C. for 15 minutes.

The positive resist pattern and the aqueous resin layer on the resist were removed with a positive resist stripper MS2001 produced by the FH Co. while lightly brushing at 40° C. for 90 seconds (patterning by a lift-off method). After washing with pure water, the substrate was dried at 180° C. for 30 minutes to obtain a glass substrate having formed thereon a desired black matrix pattern.

The resulting black matrix had an optical density of 3.3, which was sufficient for use as a black matrix. A color filter was prepared using the resulting black matrix substrate, and a transparent electrode layer was provided in the same manner as in Example 1. No problems of appearance or coloration were observed.

EXAMPLE 4

A 7059 glass substrate having a patterned positive resist layer was spin coated with an aqueous solution of an aqueous resin to a coating thickness of 0.26 μm in the same manner as in Example 1, except for replacing the aqueous resin solution containing physical development nuclei as used in Example 1 with an aqueous solution of an aqueous resin prepared by mixing 22.2 g of a 9.01% aqueous solution of polyvinyl alcohol (GOHSEFIMER Z200), 1 g of methanol, and 76.8 g of pure water. The coated substrate was heated in an oven at 150° C. for 7 minutes, dipped in a predipping liquid, Emplate PC236 solution produced by Japan Meltex Inc., for 3 minutes and washed with water. The substrate was further dipped in a palladium catalyst-imparting liquid, Emplate Activator 444 solution produced by Japan Meltex Inc., for 6 minutes and washed with water. The substrate was furthermore dipped in an adhesion enhancing liquid, Emplate PA491 produced by Japan Meltex Inc., for 10 minutes, followed by washing with water. The polyvinyl alcohol layer found faintly colored brown, indicating adsorption of palladium.

The aqueous resin layer was subjected to physical development by diffusion transfer, and the resist layer and the aqueous resin layer thereon were removed by lift-off in the same manner as in Example 3 to obtain a black matrix substrate. The resulting black matrix had an optical density of 3.4 and a reflectance of 17% at 550 nm, and provided satisfactory results similar to those obtained in Example 1.

A color filter was prepared using the resulting black matrix substrate, and a transparent electrode layer was provided in the same manner as in Example 1. No problems of appearance or coloration were observed.

EXAMPLE 5

Forming a Black Matrix Substrate by Method 3:

An aqueous solution of an aqueous resin containing palladium as physical development nuclei was prepared in the same manner as in Example 1, except that 6.1 g of a 9.01% aqueous solution of polyvinyl alcohol NM 14 produced by The Nippon Synthetic Chemical Industry Co., Ltd., 14.15 g of stilbazole-modified polyvinyl alcohol SPP-H13 produced by Toyo Gosei Kogyo K.K., and 2.7 g of water were added at room temperature while stirring in place of the aqueous solution of GOHSEFIMER Z200 (polyvinyl alcohol) as used in Example 1. Methanol (0.5 g) was further added to the solution, and the pH of the solution was adjusted to 4.6 with a 1N sodium hydroxide aqueous solution. The resulting photosensitive aqueous resin solution containing physical development nuclei was applied to the same 7059 glass substrate as prepared in Example 1 by spin coating to a thickness of about 0.29 μm and dried. The photosensitive aqueous resin layer was exposed by means of an aligner UV 330 at an exposure energy of 80 mJ/cm$^2$ through a mask and developed by shower development with warm water at 35° C. to provide a patterned aqueous resin layer containing physical development nuclei.

The substrate having the patterned aqueous resin layer was heated in an oven at 80° for 5 minutes. The patterned aqueous resin layer was subjected to physical development by diffusion transfer in the same manner as in Example 1. After washing with water and drying, the substrate was heated in an oven at 200° C. for 30 minutes to obtain the desired black matrix. The resulting black matrix had an optical density of 3.1.

A color filter was prepared using the resulting black matrix substrate, and a transparent electrode layer was provided in the same manner as in Example 1. No problems of appearance or coloration were observed.

EXAMPLE 6

Forming a Black Matrix Substrate by Method 3:

A photosensitive aqueous resin solution containing physical development nuclei was prepared as follows. In 22.6 g of pure water were dissolved 0.2 g of palladium chloride and 0.2 g of commercially available hydrochloric acid by stirring at about 40° C. The resulting palladium chloride aqueous solution and a reducing agent solution prepared by dissolving 0.03 g of sodium borohydride in 25 g of pure water were added dropwise to a protective colloid aqueous solution prepared by dissolving 0.05 g of polyvinyl pyrrolidone K90 in 26.4 g of pure water at 30° C. over 30 minutes. After stirring the mixture at room temperature for 1 hour, 27 g of a 9.01% aqueous solution of polyvinyl alcohol (GOHSEFIMER Z200), 2.4 g of a difunctional monomer A400 produced by Shin-Nakamura Chemical Co., Ltd., 0.14 g of a photopolymerization initiator Darocur 2959 produced by Merck & Co., Inc., 0.0002 g of hydroquinone monomethyl ether as a polymerization inhibitor, and 20 g of water were added thereto. Finally, 0.5 g of methanol was added to the solution.

The resulting photosensitive aqueous resin solution containing physical development nuclei was applied to the same 7059 glass substrate as prepared in Example 1 by spin coating to a thickness of about 0.3 μm and dried. The photosensitive aqueous resin layer was exposed by means of an aligner UV 330 at an exposure energy of 200 mJ/cm$^2$ through a mask and developed by shower development with warm water at 35° C. to provide a patterned aqueous resin layer containing physical development nuclei.

The substrate having the patterned aqueous resin layer was heated in an oven at 80° for 5 minutes. The patterned aqueous resin layer was subjected to physical development by diffusion transfer in the same manner as in Example 1. After washing with water and drying, the substrate was heated in an oven at 200° C. for 30 minutes to obtain the desired black matrix. The resulting black matrix had an optical density of 3.2.

A color filter was prepared using the resulting black matrix substrate, and a transparent electrode layer was provided in the same manner as in Example 1. No problems of appearance or coloration were observed.

EXAMPLE 7

A black matrix substrate was prepared in the same manner as in Example 5, except that physical development by diffusion transfer preceded shower development of the aqueous resin layer. The resulting black matrix had an optical density of 3.2, which was sufficient for use as a black matrix. A color filter was prepared using the resulting black matrix substrate, and a transparent electrode layer was provided in the same manner as in Example 1. No problems of appearance or coloration were observed.

EXAMPLE 8

Forming a Black Matrix Substrate by Method 4:

A photosensitive aqueous resin solution containing physical development nuclei was prepared by mixing 6.1 g of a 9.01% aqueous solution of polyvinyl alcohol (NM 14), 14.15 g of stilbazole-modified polyvinyl alcohol (SPP-H13), 2.7 g of water, and 0.5 g of methanol. The resulting photosensitive aqueous resin solution was applied to the same 7059 glass substrate as prepared in Example 1 by spin coating to a thickness of about 0.24 μm. The coated substrate was dipped in a predipping liquid (Emplate PC236) for 3 minutes, and washed with water. The substrate was further dipped in an palladium catalyst-imparting liquid (Emplate Activator 444 solution) for 6 minutes and washed with water. The substrate was furthermore dipped in an adhesion enhancing liquid (Emplate PA491) for 10 minutes, followed by washing with water. The polyvinyl alcohol layer was found faintly colored brown, indicating adsorption of palladium. The photosensitive aqueous resin layer was exposed by means of an aligner UV 330 at an exposure energy of 80 mJ/cm$^2$ through a mask and developed by shower development with warm water at 35° C. to provide a patterned aqueous resin layer containing physical development nuclei.

The substrate having the patterned aqueous resin layer was heated in an oven at 80° for 5 minutes. The patterned aqueous resin layer was subjected to physical development by diffusion transfer in the same manner as in Example 1. After washing with water and drying, the substrate was heated in an oven at 200° C. for 30 minutes to obtain the desired black matrix. The resulting black matrix had an optical density of 3.2.

A color filter was prepared using the resulting black matrix substrate, and a transparent electrode layer was provided in the same manner as in Example 1. No problems of appearance or coloration were observed.

EXAMPLE 9

A black matrix substrate was prepared in the same manner as in Example 6, except that physical development by diffusion transfer preceded shower development of the aqueous resin layer. The resulting black matrix had an optical density of 3.2, which was sufficient for use as a black matrix. A color filter was prepared using the resulting black matrix substrate, and a transparent electrode layer was provided in the same manner as in Example 1. No problems of appearance or coloration were observed.

As described above, the process of the present invention provides a black matrix having excellent light screening properties. This is because a metal is precipitated in an aqueous resin layer having physical development nuclei by physical development. The inventive process provides significant advantages in terms of safety and developer maintenance in the physical development processing. This is because the physical development can be carried out by supplying a very small amount of a developer between the aqueous resin layer and a donor sheet. Furthermore, the developer for physical development exhibits excellent stability because it is isolated from metallic ions. Also, the requisite amount of the developer is very small. Thus, the process of the present invention provides a very economical process. Additionally, because an aqueous resin layer does not remain on the substrate except in those areas corresponding to the desired black matrix pattern, the black matrix hardly undergoes coloration during panel processing or generation of wrinkles or cracks at the time of forming a transparent electrode layer.

While the invention has been described in detail and with reference to specific embodiments thereof, it will be apparent to one skilled in the art that various changes and modifications can be made therein without departing from the spirit and scope thereof.

What is claimed is:

1. A process for forming a black matrix comprising the steps of:
    (a) providing a transparent substrate having provided thereon a patterned aqueous resin layer containing physical development nuclei;
    (b) supplying a developer for physical development on the patterned aqueous resin layer;

(c) superposing a donor sheet containing a metallic compound comprising metal ions on the patterned aqueous resin layer via the developer for physical development; and (d) precipitating a metal of said metallic compound in said patterned aqueous resin layer by physical development.

2. A process for forming a black matrix comprising the steps of:

(a) providing a transparent substrate having provided thereon an aqueous resin layer containing physical development nuclei;

(b) supplying a developer for physical development on the aqueous resin layer;

(c) superposing a donor sheet containing a metallic compound comprising metal ions on the aqueous resin layer via the developer for physical development;

(d) precipitating a metal of said metallic compound in said aqueous resin layer by physical development;

wherein the process further comprises the steps of:

forming a photoresist layer on a transparent substrate;

imagewise exposing the photoresist layer, and developing the exposed photoresist layer to form a patterned photoresist layer;

forming an aqueous resin layer containing physical development nuclei on the entire surface of the substrate; and removing said patterned photoresist layer together with the aqueous resin layer that is on top of said patterned photoresist layer to form a patterned aqueous resin layer.

3. The process for forming a black matrix according to the claim 2, wherein the physical development steps (b) to (d) are conducted after the removing step.

4. The process for forming a black matrix according to the claim 2, wherein the physical development steps (b) to (d) are conducted before the removing step.

5. A process for forming a black matrix comprising the steps of:

(a) providing a transparent substrate having provided thereon an aqueous resin layer containing physical development nuclei;

(b) supplying a developer for physical development on the aqueous resin layer;

(c) superposing a donor sheet containing a metallic compound comprising metal ions on the aqueous resin layer via the developer for physical development;

(d) precipitating a metal of said metallic compound in said aqueous resin layer by physical development;

wherein the process further comprises the steps of:

forming a photoresist layer on a transparent substrate;

imagewise exposing the photoresist layer, and developing the exposed photoresist layer to form a patterned photoresist layer;

forming an aqueous resin layer on the entire surface of the substrate;

contacting said aqueous resin layer with an aqueous solution containing physical development nuclei to allow said aqueous resin layer to adsorb said physical development nuclei; and removing said patterned photoresist layer together with the physical development nuclei-containing aqueous resin layer on the top of said patterned photoresist layer to form a patterned aqueous resin layer.

6. The process for forming a black matrix according to the claim 5, wherein the physical development steps (b) to (d) are conducted after the removing step.

7. The process for forming a black matrix according to the claim 5, wherein the physical development steps (b) to (d) are conducted before the removing step.

8. The process for forming a black matrix according to claim 2, wherein the photoresist layer has a thickness of from 0.1 to 3 μm.

9. The process for forming a black matrix according to claim 5, wherein the photoresist layer has a thickness of from 0.1 to 3 μm.

10. The process for forming a black matrix according to claim 2, wherein the aqueous resin layer is subjected to heat treatment at 80° to 240° C. after it is formed on the patterned photoresist layer.

11. The process for forming a black matrix according to claim 5, wherein the aqueous resin layer is subjected to heat treatment at 80° to 240° C. after it is formed on the patterned photoresist layer.

12. The process for forming a black matrix according to claim 2, wherein the process further comprises the step of subjecting the patterned metal-precipitated aqueous resin layer to heat treatment at 120° to 260° C.

13. The process for forming a black matrix according to claim 5, wherein the process further comprises the step of subjecting the patterned metal-precipitated aqueous resin layer to heat treatment at 120° to 260° C.

14. A process for forming a black matrix comprising the steps of:

(a) providing a transparent substrate having provided thereon an aqueous resin layer containing physical development nuclei;

(b) supplying a developer for physical development on the aqueous resin layer;

(c) superposing a donor sheet containing a metallic compound comprising metal ions on the aqueous resin layer via the developer for physical development; and (d) precipitating a metal of said metallic compound in said aqueous resin layer by physical development;

wherein said aqueous resin layer containing physical development nuclei is a layer formed by the process comprising the steps of:

providing a photosensitive aqueous resin layer containing physical development nuclei on a transparent substrate;

imagewise exposing the photosensitive aqueous resin layer; and developing the exposed resin layer to form a patterned aqueous resin layer.

15. The process for forming a black matrix according to the claim 14, wherein the physical development steps (b) to (d) are conducted after the developing step.

16. The process for forming a black matrix according to the claim 14, wherein the physical development steps (b) to (d) are conducted before the developing step.

17. A process for forming a black matrix comprising the steps of:

(a) providing a transparent substrate having provided thereon an aqueous resin layer containing physical development nuclei;

(b) supplying a developer for physical development on the aqueous resin layer;

(c) superposing a donor sheet containing a metallic compound comprising metal ions on the aqueous resin layer via the developer for physical development;

(d) precipitating a metal of said metallic compound in said aqueous resin layer by physical development;

wherein the process further comprises the steps of:

forming a photosensitive aqueous resin layer on a transparent substrate;

contacting said photosensitive aqueous resin layer with an aqueous solution containing physical development nuclei to allow the aqueous resin layer to adsorb the physical development nuclei;

imagewise exposing the photosensitive aqueous resin layer containing the physical development nuclei; and developing the exposed resin layer to form a patterned aqueous resin layer.

18. The process for forming a black matrix according to the claim 17, wherein the physical development steps (b) to (d) are conducted after the developing step.

19. The process for forming a black matrix according to the claim 18, wherein the physical development steps (b) to (d) are conducted before the developing step.

20. The process for forming a black matrix according to claim 14, wherein the metal-precipitated aqueous resin layer after development is washed with water and subjected to heat treatment at 120° to 260° C.

21. The process for forming a black matrix according to claim 17, wherein the metal-precipitated aqueous resin layer after development is washed with water and subjected to heat treatment at 120° to 260° C.

* * * * *